(12) United States Patent
Selems et al.

(10) Patent No.: US 6,402,502 B1
(45) Date of Patent: Jun. 11, 2002

(54) THERMALLY CONDUCTIVE HUB BUSHING

(75) Inventors: Michael J. Selems, Terre Haute, IN (US); J. Hans Richter, Lancaster, PA (US); Jeffrey C. Peinhardt, Quarryville, PA (US); Yury Madoksky, Lancaster, PA (US)

(73) Assignee: Richter Precision, Inc., East Petersburg, PA (US)

( * ) Notice: Subject to any disclaimer, the term of this patent is extended or adjusted under 35 U.S.C. 154(b) by 0 days.

(21) Appl. No.: 09/635,026

(22) Filed: Aug. 4, 2000

(51) Int. Cl.[7] ............................................... B29C 45/18
(52) U.S. Cl. ...................................... 425/549; 425/810
(58) Field of Search ................................. 425/549, 810

(56) References Cited

U.S. PATENT DOCUMENTS 5,820,898 A    10/1998  Yasuda ....................... 425/542
6,220,850 B1 *  4/2001  Cateon et al. ............... 425/549
6,238,197 B1 *  5/2001  Van Holdt et al. ........... 425/810

* cited by examiner

Primary Examiner—Tim Heitbrink
(74) Attorney, Agent, or Firm—Martin Fruitman

(57) ABSTRACT

The apparatus is a hub bushing, called a gate insert, for an optical disc mold in which a thermally conductive but soft metal base structure is coated with a thin film physical vapor deposition or chemical vapor deposition coating which furnishes an extremely hard coating to protect the surfaces from wear. The base structure material of the gate insert is copper, aluminum, or a copper or aluminum based alloy, and typical materials used for the physical vapor deposition or chemical vapor deposition coating are titanium nitride, titanium carbide, or titanium carbonitride. Since the coating is only a few micrometers thick it has virtually no affect on the excellent thermal conductivity of the base structure, and the high thermal conductivity of the gate insert prevents quality degradation in the optical discs produced by the mold because the mold surfaces are prevented from having too great a difference in temperatures.

12 Claims, 2 Drawing Sheets

THERMALLY CONDUCTIVE HUB BUSHING

BACKGROUND OF THE INVENTION

This invention deals generally with plastic injection molds and more specifically with a gate insert within the mold with the gate insert constructed to reduce thermal stress in optical discs produced by such molds.

The production of optical discs, such as compact discs, DVD discs and CDR discs involves molding a thermoplastic or thermoset into the disc that the consumer ultimately purchases. These optical discs are cast in individual molds, and must meet stringent criteria for optical quality. The final optical quality is greatly determined by the internal stress to which the disc is subjected during its manufacture. More specifically, the internal stress is created by temperature variations within the casting mold.

The molding process involves injecting hot thermoplastic or thermoset liquid at a location at the center of a disc-shaped mold and permitting the material to flow radially outward into the other more remote portions of the mold. Optical disc molds typically include a cylindrical annular hub bushing called a gate insert located near the center of the mold, into which a sprue bushing is inserted. The hot liquid polycarbonate is furnished through the sprue bushing, and the annular gate insert, the portion of the mold which is subjected to the hottest temperatures, has circumferential channels formed into its surface through which cooling water flows in order to reduce the temperature of the gate insert. The outer flat portions of the mold, the surfaces which form the majority of the upper and lower disc surfaces, are also typically water cooled.

The typical annular gate insert is constructed of steel because the gate insert is subjected to significant wear by erosion from the liquid polycarbonate and contact with other moving parts of the mold assembly. When the wear on the gate insert is great enough, the entire manufacturing process must be shut down to replace the gate insert. Unfortunately, however, the steel used to reduce wear of the gate insert is a relatively poor heat conductor, so that even with the gate insert exterior cylindrical surface cooled by water, the end surface which is the mold boundary surface and is in contact with the hot thermoplastic or thermoset retains heat and causes optical distortion in the finished disc.

When the liquid polycarbonate is injected into the center of the mold it is very hot, and transfers some of that heat to the gate insert mold boundary surface. Due to insufficient cooling with the conventional steel inserts, a temperature difference results between the inner radius of the disc at the gate insert and the outer radius of the disc. This temperature difference causes residual physical stress in the finished disc which is due to non-uniform cooling and retained heat in the gate insert.

It would be very beneficial to have gate inserts available which have very good thermal conductivity but are also able to resist damage from operation in the molds.

SUMMARY OF THE INVENTION

The present invention constructs gate inserts in the same configurations in which they were previously made, but uses a different combination of materials. The gate insert of the present invention is essentially constructed of copper or aluminum or a copper or aluminum based alloy such as copper-beryllium, copper-aluminum, copper zinc, or aluminum-zinc-magnesium. However, such materials by themselves, although excellent heat conductors, can not be used as gate inserts because they are far too soft and would wear extremely fast.

Therefore, in the present invention the exterior surfaces of the base structure of the gate insert are coated with a thin film physical vapor deposition (PVD) or chemical vapor deposition (CVD) coating which furnishes an extremely hard coating to protect the surfaces from wear. Furthermore, since the PVD or CVD coating is only 0.25 to 10 micrometers thick, it has virtually no effect on the heat conductivity between the water cooled channels and the mold boundary surface in contact with the optical disc. Typical materials used for the physical vapor deposition and chemical vapor deposition coating are titanium nitride, titanium carbide, titanium carbonitride, titanium aluminum nitride, chromium nitride, chromium carbide, zirconium nitride, zirconium carbide, and metal diamond-like-carbon or multiple layers of such materials. The application of such coatings to metal parts is well understood by those skilled in the art.

The invention thereby furnishes gate inserts with the heat conductivity of the best heat conductive metals available and surface hardness and wear resistance which not only exceeds that of the metal used, but actually surpasses the wear resistance of the steels conventionally in use for gate inserts for optical disc molds.

The results of the invention are best demonstrated by the measurement on finished optical discs of the property known as birefringence. Birefringence is a signal measurement of the optical clarity of an optical disc. It is also an indicator of the residual physical stress in the disc. The test is made by taking optical measurements starting at the inner radius of the disc, which is determined by the location of the gate insert, and progressing outward along greater radial distances to the outer edge of the disc.

Although the ideal goal for birefringence is a reading of zero, industry specifications state that for audio compact discs and DVD disks birefringence should be less that +/−50 nanometers, while the standard for CDR discs is less than +/−30 nanometers. Conventional steel gate inserts often produce discs which are out of specification.

Using the gate insert of the present invention, discs are consistently produced with birefringence readings within the range of +/−15 nanometers.

DETAILED DESCRIPTION OF THE INVENTION

Figure 1:
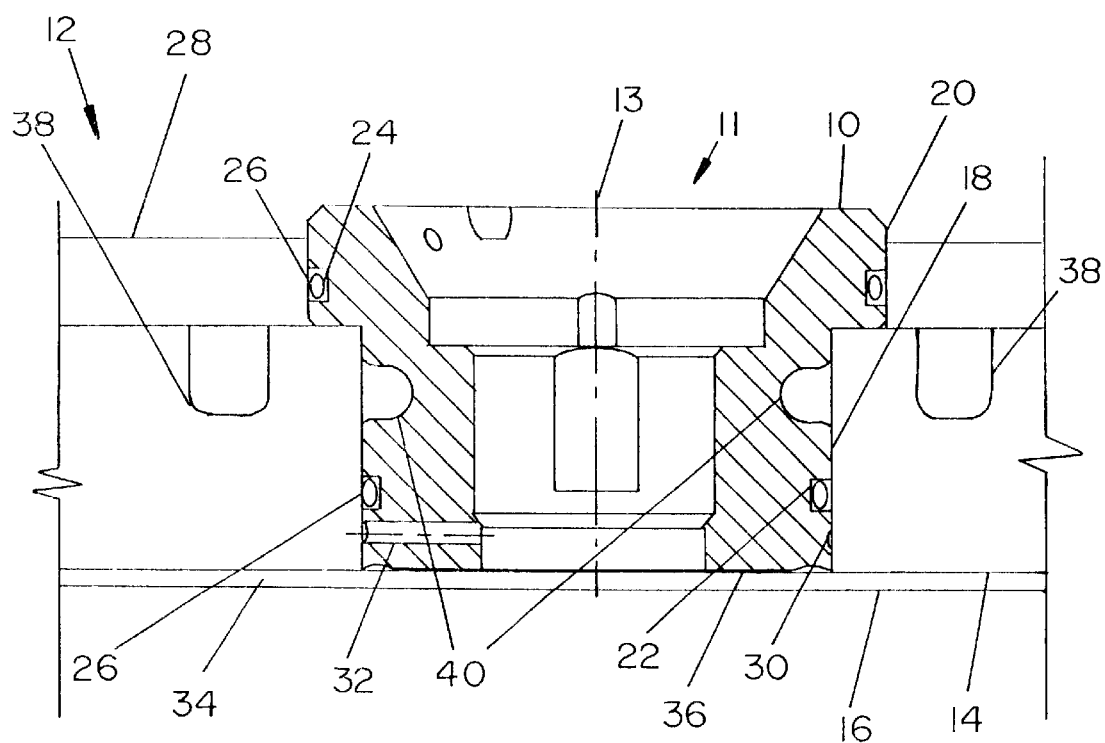
FIG. 1 is a cross section view through the center of the cylindrical gate insert of the invention as typically installed near the center of a mold for optical discs.

FIG. 1 is a cross section view through the center of gate insert 10 of the invention as typically installed near the center of mold 12 for making optical discs. Mold 12 is constructed essentially of upper mold section 14 and lower mold section 16. Although there are many more parts in the typical optical disc mold, they are not shown in FIG. 1 because they have no significance for the present invention. It should also be appreciated that another part of mold 12, a sprue bushing (not shown), is actually inserted into central opening 11 of gate insert 10 when mold 12 is in use.

Gate insert 10 is generally cylindrical in shape and coaxial with mold 12 which has centerline 13. Exterior cylindrical surfaces 18 and 20 of gate insert 10 include several circumferential grooves for purposes associated with the assembly and operation of mold 12. For example, grooves 22 and 24 capture "O" rings 26 to seal the boundaries of gate insert 10 with upper mold section 14 and cover plate 28, and groove 30 is used in conjunction with air tube 32 when air is pumped through gate insert 10 to aid in separating the completed optical disc from mold 12.

Figure 2:
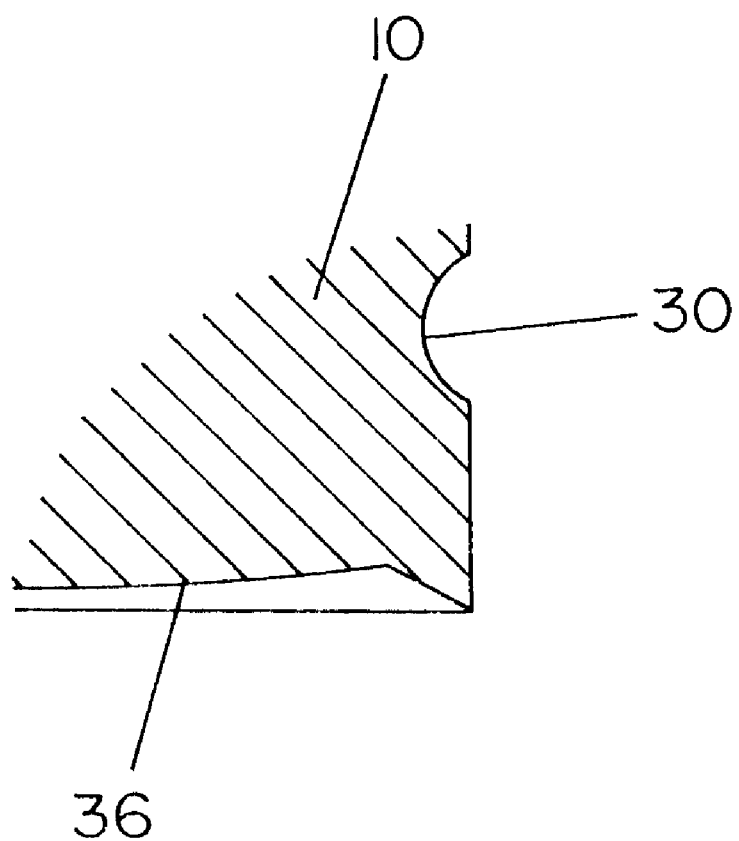
FIG. 2 is an enlarged cross section view of a corner of the bottom surface of the gate insert of FIG. 1.

As shown in FIG. 2, which is an enlarged cross section view of a corner of the bottom surface of the gate insert of FIG. 1, gate insert 10 also has a specific shape to its mold boundary surface 36. This small cut-away shape causes a region which is slightly raised to be formed in the center of the finished optical disc. This raised region is used to slightly separate optical discs which are stacked together.

The process in which mold 12 is used involves injecting hot liquid thermoplastic into mold cavity 34 formed between upper mold section 14 and lower mold section 16. This hot liquid thermoplastic is fed through the sprue bushing (not shown) to the center of mold 12 at centerline 13, and flows radially outward past gate insert 10 to the far ends of mold cavity 34.

As previously discussed, the quality of the optical discs produced by the mold is detrimentally affected when the temperature throughout the walls of mold cavity 34 varies. However, the hot thermoplastic contacts mold boundary surface 36 of gate insert 10 when the thermoplastic is at its hottest, while the thermoplastic is considerably cooler when it contacts the outer edges of upper mold section 14 and lower mold section 16.

To help cool the mold and equalize the temperature, upper mold section 14 and lower mold section 16 include water cooling passages 38 (not shown on lower section 16), and gate insert 10 also has cooling groove 40 formed in cylindrical surface 18. Cooling water flowing through groove 40 is the basic means by which heat is removed from gate insert 10.

However, gate insert 10 has other design criteria which have previously forced gate insert 10 to be made from materials which are poor heat conductors. Since the flowing thermoplastic and other parts of mold 12 which come into contact with gate insert 10 cause severe wear on gate insert 10, it has previously been made from steel. However, while steel to some extent alleviates the problem of wear of the surfaces of gate insert 10, the poor thermal conductivity of steel leaves mold boundary surface 36 of gate insert 10 at too high a temperature, which causes poor quality optical discs.

The preferred embodiment of gate inset 10 of the present invention provides both superior wear resistance and improved thermal conductivity by changing the material and the structure of gate insert 10.

In the preferred embodiment of the present invention the base structure of gate insert 10 of the present invention is constructed of copper or other good heat conductors such as aluminum or a copper or aluminum based alloy such as copper-beryllium, copper-aluminum, copper zinc, or aluminum-zinc-magnesium. However, such materials by themselves, although excellent heat conductors, can not be used as gate insert 10 because they are far too soft and would wear extremely fast.

Therefore, in the present invention, mold boundary surface 36 and exterior surfaces 18 and 20 of gate insert 10 are all coated with thin film physical vapor deposition or chemical vapor deposition coatings which furnish an extremely hard coating to protect the surface of the gate insert from wear. The physical vapor deposition or chemical vapor deposition coatings are only 0.25 to 10 micrometers thick, so they have virtually no effect on the heat conductivity between water cooling groove 40 and the mold boundary surface 36.

Materials used for the physical vapor deposition or chemical vapor deposition coating are selected from among titanium nitride, titanium carbide, titanium carbonitride, titanium aluminum nitride, chromium nitride, chromium carbide, zirconium nitride, zirconium carbide, and metal diamond-like-carbon, and multiple layers of such materials can also be used. The application of such physical vapor deposition and chemical vapor deposition coatings to metal parts is well understood by those skilled in the art.

The invention thereby furnishes gate inserts with the heat conductivity of the best heat conductive metals available and surface hardness and wear resistance which not only exceeds that of the base metal used, but actually surpasses the wear resistance of the steels conventionally in use for gate inserts for optical disc molds.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters Patent of the United States are desired to be secured is:

1. A gate insert for an optical disc mold comprising:
   a metal base structure selected from the group consisting of copper, aluminum, copper alloys, and aluminum alloys; and
   a coating of physical vapor deposition material covering the exterior surfaces of the base structure, with the physical vapor deposition material selected from the group consisting of titanium nitride, titanium carbide, titanium carbonitride, titanium aluminum nitride, chromium nitride, chromium carbide, zirconium nitride, zirconium carbide, and metal diamond-like-carbon.

2. The gate insert of claim 1 wherein the coating of physical vapor deposition material has a thickness in the range of between 0.25 and 10 micrometers.

3. The gate insert of claim 1 wherein the coating of physical vapor deposition material comprises multiple layers.

4. A gate insert for an optical disc mold comprising:
   a metal base structure selected from the group consisting of copper, aluminum, copper-beryllium, copper-aluminum, copper zinc, and aluminum-zinc-magnesium; and
   a coating of physical vapor deposition material covering the exterior surfaces of the base structure, with the physical vapor deposition material selected from the group consisting of titanium nitride, titanium carbide, titanium carbonitride, titanium aluminum nitride, chromium nitride, chromium carbide, zirconium nitride, zirconium carbide, and metal diamond-like-carbon.

5. The gate insert of claim 4 wherein the coating of physical vapor deposition material has a thickness in the range of between 0.25 and 10 micrometers.

6. The gate insert of claim 4 wherein the coating of physical vapor deposition material comprises multiple layers.

7. A gate insert for an optical disc mold comprising:
   a metal base structure selected from the group consisting of copper, aluminum, copper alloys, and aluminum alloys; and a coating of chemical vapor deposition material covering the exterior surfaces of the base structure, with the chemical vapor deposition material selected from the group consisting of titanium nitride, titanium carbide, titanium carbonitride, titanium aluminum nitride, chromium nitride, chromium carbide, zirconium nitride, zirconium carbide, and metal diamond-like-carbon.

8. The gate insert of claim 7 wherein the coating of chemical vapor deposition material has a thickness in the range of between 0.25 and 10 micrometers.

9. The gate insert of claim 7 wherein the coating of chemical vapor deposition material comprises multiple layers.

10. A gate insert for an optical disc mold comprising:
a metal base structure selected from the group consisting of copper, aluminum, copper-beryllium, copper-aluminum, copper zinc, and aluminum-zinc-magnesium; and
a coating of chemical vapor deposition material covering the exterior surfaces of the base structure, with the chemical vapor deposition material selected from the group consisting of titanium nitride, titanium carbide, titanium carbonitride, titanium aluminum nitride, chromium nitride, chromium carbide, zirconium nitride, zirconium carbide, and metal diamond-like-carbon.

11. The gate insert of claim 10 wherein the coating of chemical vapor deposition material has a thickness in the range of between 0.25 and 10 micrometers.

12. The gate insert of claim 10 wherein the coating of chemical vapor deposition material comprises multiple layers.

* * * * *